United States Patent
Dohle et al.

(10) Patent No.: US 7,638,225 B2
(45) Date of Patent: Dec. 29, 2009

(54) CATHODE FOR A DIRECT METHANOL FUEL CELL AND METHOD FOR OPERATING THE SAME

(75) Inventors: Hendrik Dohle, Stolberg (DE); Martin Müller, Bonn (DE); Jan Bringmann, Titz (DE); Jürgen Mergel, Jülich (DE); Detlef Stolten, Aachen (DE)

(73) Assignee: Forschungszentrum Julich GmbH, Julich (DE)

( * ) Notice: Subject to any disclaimer, the term of this patent is extended or adjusted under 35 U.S.C. 154(b) by 426 days.

(21) Appl. No.: 10/553,574

(22) PCT Filed: Apr. 8, 2004

(86) PCT No.: PCT/DE2004/000735

§ 371 (c)(1),
(2), (4) Date: Aug. 29, 2006

(87) PCT Pub. No.: WO2004/093225

PCT Pub. Date: Oct. 28, 2004

(65) Prior Publication Data

US 2007/0128502 A1  Jun. 7, 2007

(30) Foreign Application Priority Data

Apr. 16, 2003 (DE) ............................... 103 17 780

(51) Int. Cl.
*H01M 4/00* (2006.01)
*H01M 8/00* (2006.01)

(52) U.S. Cl. .......................................... 429/40; 429/12

(58) Field of Classification Search ................... 429/30, 429/33, 32

See application file for complete search history.

(56) References Cited

U.S. PATENT DOCUMENTS

| | | | |
|---|---|---|---|
| 4,585,711 A | 4/1986 | Vaidyanathan | |
| 6,541,147 B1 | 4/2003 | McLean et al. | |
| 2002/0009627 A1 * | 1/2002 | Smotkin | 429/30 |
| 2003/0006145 A1 | 1/2003 | Schiepe et al. | |

FOREIGN PATENT DOCUMENTS

| | | |
|---|---|---|
| DE | 100 48 182 | 5/2001 |
| EP | 1 096 586 | 5/2001 |
| EP | 1429408 A1 * | 6/2004 |
| WO | WO 03081707 * | 2/2003 |

* cited by examiner

*Primary Examiner*—Dah-Wei D Yuan
*Assistant Examiner*—Steven Scully
(74) *Attorney, Agent, or Firm*—Andrew Wilford

(57) ABSTRACT

In low-temperature fuel cells according to prior art, the problem often arises that the diffusion layer of the cathode is filled by water which is permeated or produced on the cathode, such that oxygen can no longer be transported to the catalyst layer of the cathode in a frictionless manner. As a result, said fuel cells are regularly used with a high excess of oxygen in order to reduce the cited transport problems for the oxygen. The inventive fuel cell enables said problem to be solved in that the arrangement of the diffusion layer and the catalyst layer of the cathode is inverted. The diffusion layer, which is embodied in such a way as to also conduct ions, is directly adjacent to the electrolyte membrane. The catalyst layer oriented towards the free cathode space can advantageously directly react with the supplied oxygen without further transport problems. A further advantage lies in the fact that the water produced on the catalyst layer of the cathode and/or permeated by the electrolyte membrane and the diffusion layer can be easily withdrawn via the free cathode space.

7 Claims, 1 Drawing Sheet

CATHODE FOR A DIRECT METHANOL FUEL CELL AND METHOD FOR OPERATING THE SAME

CROSS REFERENCE TO RELATED APPLICATIONS

Figure 1:
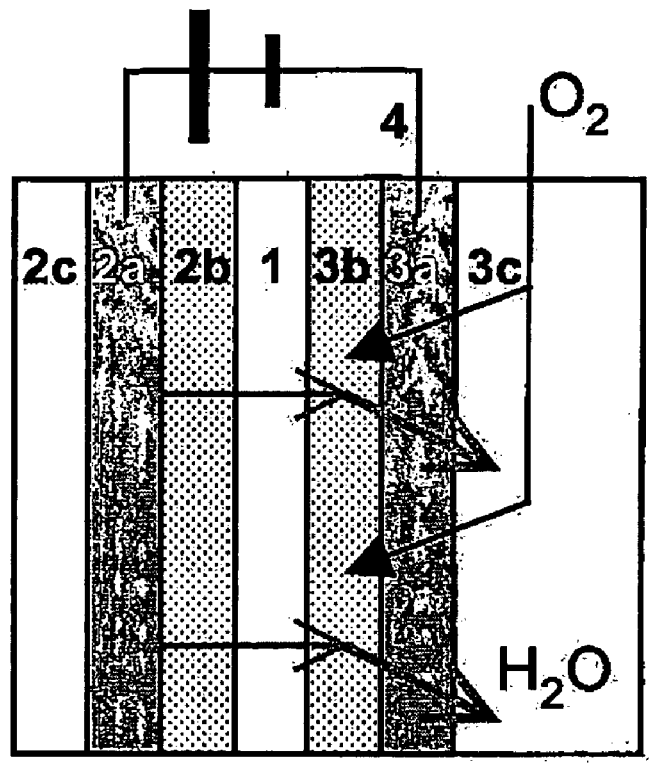

This application is the U.S. national phase of PCT application PCT/DE2004/000735, filed 8 Apr. 2004, published 28 Oct. 2004 as WO 2004/093225, and claiming the priority of German patent application 10317780.9 itself filed 16 Apr. 2003, whose entire disclosures are herewith incorporated by reference.

FIELD OF THE INVENTION

The invention relates to a cathode for a low-temperature fuel cell, especially for a direct methanol fuel cell, and to an advantageous method of operating same.

BACKGROUND OF THE INVENTION

A low-temperature fuel cell, especially a polymer-electrolyte-membrane (PEM) fuel cell is comprised of an anode and a cathode which are separated by a polymer membrane which is permeable for ions. This electrolyte is about 0.1 mm thick. The gas-tight membrane, which is impermeable for hydrogen and oxygen and is also not conductive with respect to electrons is as a rule permeable to protons. The catalyst layer contains as a rule platinum or platinum alloys and is arranged as a thin catalytically effective member on the membrane. The electrodes have a high porosity and thus a large surface area which is advantageous for the electrochemical reactions which are to be carried out thereon.

The electronically conducting diffusion layer of the electrode is connected with the current collector and bounded directly on the catalyst layer.

Through the so-called bipolar plates, the individual cells are separated from one another on the one hand and serve to feed the operating media, fuel and oxidizing agent, on the other, on the other. With the aid of suitable distributor structures, the operating media are uniformly fed homogeneously to the electrodes.

The hydrogen supplied to the anode reacts electrochemically at the anode with the aid of the catalyst. The electrons which are thereby liberated travel through the current collector to the external electric current circuit while the protons diffuse through the electrolyte membrane to the cathode. The negatively charged electrolyte ions conduct the protons further although the ions themselves remain locally fixed. At the catalyst layer of the cathode the oxygen ions from the air recombine with the electrons from the external electric circuit and protons from the membrane and produce water with the development of heat. The membrane at the anode side is maintained uniformly moist while at the cathode side the product water generally must be removed.

With the low-temperature fuel cells known from the state of the art, a problem arises in that the diffusion layer of the cathode tends to be plugged or flooded by permeating water or water generated at the cathode so that a frictionless oxygen transport to the catalyst layer of the cathode can no longer occur. As a consequence, these fuel cells must generally be operated with a high excess of oxygen so as to reduce the above-described transport problems for the oxygen.

OBJECT OF THE INVENTION

The object of the invention is to provide a fuel cell in which the aforementioned mass transport blockages and problems and of flooding or plugging the cathode with permeating and produced water can be prevented or obviated.

SUMMARY OF THE INVENTION

The underlying concept of the invention is based upon the fact that the oxygen required at the cathode need not be fed first through the porous layer (diffusion layer) of the cathode to the catalyst layer since this as a rule can be plugged or flooded by water which creates a mass transport problem for the diffusing oxygen.

Rather, to solve this problem, the invention provides a fuel cell with a cathode which comprises a diffusion layer with the catalyst layer arranged thereon and in which the diffusion layer directly bounds the ion conducting membrane and the free cathode space turned toward the side of the catalyst layer has the oxygen fed directly thereto.

In principle this results in a replacement of the usual arrangement of the layers of a cathode within a fuel cell as has been the case up to now. Since with the cathode according to the invention in the diffusion layer apart from the electron transport also as ion transport occurs, the diffusion layer is an ion conducting material. Especially the diffusion layer has a high proportion of an ionomer phase.

With the cathode according to the invention the gaseous oxygen is advantageously fed directly onto the catalyst layer optionally through a distributor structure. The protons travel from the anode through the electrolyte membrane and then through the diffusion layer of the cathode which is both electron and ion conductive, to the catalyst layer where the electrochemical reaction occurs. The electrons are transported by the current conductor also through the electron conducting diffusion layer of the cathode to the catalyst layer. The water filled or plugged (flooded) diffusion layer is then advantageously no longer a transport barrier for the oxygen. Simultaneously the water which is produced at the catalyst layer can easily be conducted into the free cathode compartment and need no longer pass first through the diffusion layer as is the case with the state of the art.

The fuel cells according to the invention and the method of operating such a fuel cell have the following advantages with respect to the state of the art:

The catalyst layer can be supplied with oxygen in a simple manner without material transport barriers to the oxygen transport.

The water formed at the catalyst layer can together with permeating water be easily discharged through the cathode compartment since it can directly flow off into the free cathode compartment and need no longer travel through a porous material.

SPECIFIC DESCRIPTION

In the following, the subject matter of the invention is described based upon two figures and an example in greater detail without limiting the scope of the invention thereby.

Legends for the figures:
1. Ion conducting electrolyte membrane
2. Anode:
   2a. Electrically conducting diffusion layer
   2b. Catalyst layer 2c. Free anode compartment, optionally with distributor structure.
3. Cathode:
   3a. Electrically conducting diffusion layer.
   3b. Catalyst layer.
   3c. Free cathode department, optionally with distributor structure.
4. Current collector.

FIG. 1 shows schematically the structure of a fuel cell according to the state of the art in which the catalyst layer of the cathode bounds directly on the electrolyte membrane.

Figure 2:
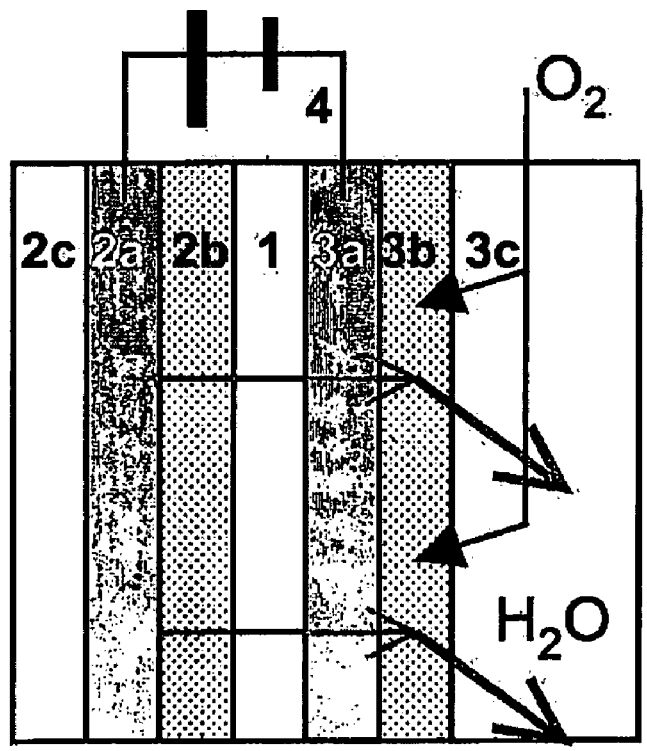

By contrast FIG. 2 shows an embodiment according to the invention of a fuel cell with a cathode 3 whose diffusion layer 3a directly bounds on the electrolyte membrane 1 and the catalyst layer 3b is open to the free cathode compartment 3c.

CATHODE FOR A DIRECT METHANOL FUEL CELL AND METHOD FOR OPERATING SAME

CROSS REFERENCE TO RELATED APPLICATIONS

This application is the U.S. national phase of PCT application PCT/DE2004/000735, filed 8 Apr. 2004, published 28 Oct. 2004 as WO 2004/093225, and claiming the priority of German patent application 10317780.9 itself filed 16 Apr. 2003, whose entire disclosures are herewith incorporated by reference.

FIELD OF THE INVENTION

The invention relates to a cathode for a low-temperature fuel cell, especially for a direct methanol fuel cell, and to an advantageous method of operating same.

BACKGROUND OF THE INVENTION

A low-temperature fuel cell, especially a polymer-electrolyte-membrane (PEM) fuel cell is comprised of an anode and a cathode which are separated by a polymer membrane which is permeable for ions. This electrolyte is about 0.1 mm thick. The gas-tight membrane, which is impermeable for hydrogen and oxygen and is also not conductive with respect to electrons is as a rule permeable to protons. The catalyst layer contains as a rule platinum or platinum alloys and is arranged as a thin catalytically effective member on the membrane. The electrodes have a high porosity and thus a large surface area which is advantageous for the electrochemical reactions which are to be carried out thereon.

The electronically conducting diffusion layer of the electrode is connected with the current collector and bounded directly on the catalyst layer.

Through the so-called bipolar plates, the individual cells are separated from one another on the one hand and serve to feed the operating media, fuel and oxidizing agent, on the other, on the other. With the aid of suitable distributor structures, the operating media are uniformly fed homogeneously to the electrodes.

The hydrogen supplied to the anode reacts electrochemically at the anode with the aid of the catalyst. The electrons which are thereby liberated travel through the current collector to the external electric current circuit while the protons diffuse through the electrolyte membrane to the cathode. The negatively charged electrolyte ions conduct the protons further although the ions themselves remain locally fixed. At the catalyst layer of the cathode the oxygen ions from the air recombine with the electrons from the external electric circuit and protons from the membrane and produce water with the development of heat. The membrane at the anode side is maintained uniformly moist while at the cathode side the product water generally must be removed.

With the low-temperature fuel cells known from the state of the art, a problem arises in that the diffusion layer of the cathode tends to be plugged or flooded by permeating water or water generated at the cathode so that a frictionless oxygen transport to the catalyst layer of the cathode can no longer occur. As a consequence, these fuel cells must generally be operated with a high excess of oxygen so as to reduce the above-described transport problems for the oxygen.

OBJECT OF THE INVENTION

The object of the invention is to provide a fuel cell in which the aforementioned mass transport blockages and problems and of flooding or plugging the cathode with permeating and produced water can be prevented or obviated.

SUMMARY OF THE INVENTION

The underlying concept of the invention is based upon the fact that the oxygen required at the cathode need not be fed first through the porous layer (diffusion layer) of the cathode to the catalyst layer since this as a rule can be plugged or flooded by water which creates a mass transport problem for the diffusing oxygen.

Rather, to solve this problem, the invention provides a fuel cell with a cathode which comprises a diffusion layer with the catalyst layer arranged thereon and in which the diffusion layer directly bounds the ion conducting membrane and the free cathode space turned toward the side of the catalyst layer has the oxygen fed directly thereto.

In principle this results in a replacement of the usual arrangement of the layers of a cathode within a fuel cell as has been the case up to now. Since with the cathode according to the invention in the diffusion layer apart from the electron transport also as ion transport occurs, the diffusion layer is an ion conducting material. Especially the diffusion layer has a high proportion of an ionomer phase.

With the cathode according to the invention the gaseous oxygen is advantageously fed directly onto the catalyst layer optionally through a distributor structure. The protons travel from the anode through the electrolyte membrane and then through the diffusion layer of the cathode which is both electron and ion conductive, to the catalyst layer where the electrochemical reaction occurs. The electrons are transported by the current conductor also through the electron conducting diffusion layer of the cathode to the catalyst layer. The water filled or plugged (flooded) diffusion layer is then advantageously no longer a transport barrier for the oxygen. Simultaneously the water which is produced at the catalyst layer can easily be conducted into the free cathode compartment and need no longer pass first through the diffusion layer as is the case with the state of the art.

The fuel cells according to the invention and the method of operating such a fuel cell have the following advantages with respect to the state of the art:

The catalyst layer can be supplied with oxygen in a simple manner without material transport barriers to the oxygen transport.

The water formed at the catalyst layer can together with permeating water be easily discharged through the cathode compartment since it can directly flow off into the free cathode compartment and need no longer travel through a porous material.

SPECIFIC DESCRIPTION

In the following, the subject matter of the invention is described based upon two figures and an example in greater detail without limiting the scope of the invention thereby.

Legends for the figures:
1. Ion conducting electrolyte membrane
2. Anode:
   2a. Electrically conducting diffusion layer
   2b. Catalyst layer
   2c. Free anode compartment, optionally with distributor structure.
3. Cathode:
   3a. Electrically conducting diffusion layer.
   3b. Catalyst layer.
   3c. Free cathode department, optionally with distributor structure.
4. Current collector.

FIG. 1 shows schematically the structure of a fuel cell according to the state of the art in which the catalyst layer of the cathode bounds directly on the electrolyte membrane.

By contrast FIG. 2 shows an embodiment according to the invention of a fuel cell with a cathode 3 whose diffusion layer 3a directly bounds on the electrolyte membrane 1 and the catalyst layer 3b is open to the free cathode compartment 3c.

The invention claimed is:

1. A method of operating a low-temperature fuel cell with
an anode,
a cathode comprising
  a diffusion layer and
  a catalyst layer on the diffusion layer and bounding directly on a free cathode compartment, and
an electrolyte membrane directly engaging the diffusion layer and arranged between the cathode and the anode,
the method comprising the steps of:
causing protons produced at the anode to travel through the electrolyte membrane and then through the diffusion layer of the cathode to the catalyst layer, and
supplying oxygen via the free cathode compartment directly to the catalyst layer.

2. The method according to claim 1 in which methanol or a methanol water mixture is supplied as a fuel.

3. The method according to claim 1 in which the oxygen is supplied as pure oxygen or as atmospheric oxygen.

4. The method according to claim 1, further comprising the step of:
directly discharging water produced at the catalyst layer of the cathode through the free cathode compartment.

5. A low-temperature fuel cell comprising:
an anode;
a cathode;
an electrolyte membrane between the anode and the cathode;
a diffusion layer forming a face of the cathode and engaging directly against the electrolyte membrane; and
a catalyst layer forming an opposite face of the cathode, turned away from the anode, and bounding directly on a free cathode compartment.

6. The low-temperature fuel cell according to claim 5 in which the diffusion layer of the cathode is composed of an ion-conducting material.

7. The low-temperature fuel cell defined in claim 5 wherein the diffusion layer is composed of a proton-conducting material.

* * * * *